(12) United States Patent
Peng et al.

(10) Patent No.: US 8,369,226 B2
(45) Date of Patent: Feb. 5, 2013

(54) METHOD AND DEVICE OF PROCESSING A GENERIC FRAMING PROCEDURE FRAME

(75) Inventors: SongTao Peng, Shanghai (CN); QiCheng Kuang, Shanghai (CN)

(73) Assignee: Alcatel Lucent, Paris (FR)

( * ) Notice: Subject to any disclaimer, the term of this patent is extended or adjusted under 35 U.S.C. 154(b) by 1658 days.

(21) Appl. No.: 11/245,057

(22) Filed: Oct. 7, 2005

(65) Prior Publication Data

US 2006/0092979 A1    May 4, 2006

(30) Foreign Application Priority Data

Nov. 3, 2004  (CN) .......................... 2004 1 0067851

(51) Int. Cl.
    *G01R 31/08*    (2006.01)
(52) U.S. Cl. ........................ 370/242; 370/469
(58) Field of Classification Search .................. 370/242, 370/252, 474
    See application file for complete search history.

(56) References Cited

U.S. PATENT DOCUMENTS

| | | | | |
|---|---|---|---|---|
| 5,703,409 | A * | 12/1997 | Fukumitsu et al. | 714/704 |
| 5,875,200 | A * | 2/1999 | Glover et al. | 714/784 |
| 5,923,681 | A * | 7/1999 | Denton | 714/758 |
| 6,532,565 | B1 * | 3/2003 | Roth et al. | 714/761 |
| 7,050,399 | B2 * | 5/2006 | Masuda | 370/245 |
| 2002/0090007 | A1 * | 7/2002 | Kamiya et al. | 370/476 |
| 2003/0217320 | A1 * | 11/2003 | Gorshe | 714/758 |
| 2004/0076168 | A1 * | 4/2004 | Patenaude | 370/406 |
| 2006/0041826 | A1 * | 2/2006 | Bhattacharya et al. | 714/782 |

OTHER PUBLICATIONS

Liaison to IEEE RPRWG, "SONET/SDH and OTN GFP Adaptation/Encapsulation of 802.17 MAC Clients". George Young, SBC Technology Resources, Inc. IEEE 802.17—May 17, 2001.*

Gorsche S S Ed—Institute of Electrical and Electronics Engineers: "CRC-16 polynomials optimized for applications using self-synchronous scramblers" ICC 2002, 2002 IEEE International Conference on Communications, Conference Proceedings, New York, NY, Apr. 28-May 2, 2002, IEEE International Conference on Communications, New York, NY: IEEE, US, vol. 1 of 5, pp. 2791-2795, XP010589989.

Steven S Gorshe, et al.: "Transparent Generic Framing Procedure (GFP): A Protocol for Efficient Transport of Block-Coded Data through SONET/SDH Networks," IEEE Communications Magazine, IEEE Service Center, Piscataway, US, vol. 40, No. 5, May 2002, pp. 88-95, XP011092831.

"Generic Framing Procedure (GFP)" ITU-T Standard Superseded (S), International Telecommunication Union, Geneva, CH, No. G7041/Y1303 12/3, Dec. 14, 2003, pp. 5-12, 26, XP017404564.

* cited by examiner

*Primary Examiner* — David Oveissi
(74) *Attorney, Agent, or Firm* — Carmen Patti Law Group, LLC

(57) ABSTRACT

The present invention discloses a method of processing a generic framing procedure (GFP) frame, the method includes the steps of: processing the GFP frame by the compensating process of payload area descrambler error multiplication factor; and processing the GFP frame by the process of tHEC or/and eHEC single-bit error correction. According to the present invention, not only a tHEC or/and eHEC single-bit error can be corrected, but also the tHEC or/and eHEC additional single-bit error can also be corrected so that the equipment's dependability and capability of anti-interference are improved significantly.

24 Claims, 11 Drawing Sheets

METHOD AND DEVICE OF PROCESSING A GENERIC FRAMING PROCEDURE FRAME

CROSS-REFERENCE TO RELATED APPLICATION(S)

This application is based on the Chinese Patent Application No. 200410067851.4 filed on Nov. 3, 2004, the disclosure of which is hereby incorporated by reference thereto in its entirety, and the priority of which is hereby claimed under 35 U.S.C. §119.

FIELD OF THE INVENTION

The present invention relates to the transmission network field, and more particularly to a method and device of processing a Generic Framing Procedure (GFP) frame.

BACKGROUND OF THE INVENTION

With the rapid development of Internet, data service is becoming the mainstream of network services. How to efficiently transmit data service while guaranteeing the conventional Time Division Multiplex (TDM) service transmission is a major challenge to telecommunication operators. The Generic Framing Procedure (GFP) technology can encapsulate protocol data units (PDUs) into GFP frames efficiently and transmit them on the network, which makes it possible for telecommunication operators to build an advanced, flexible and strong new-generation Multi-Service Transmission Platform (MSTP) network.

The GFP is defined in ITU-T recommendation G.7041/Y.1303 or in ANSI standards. This framing procedure can be applied to both the encapsulation of entire client frames (frame mapped GFP), in which a single client frame is mapped into a single GFP frame, and to character mapped transport (transparent GFP), in which a number of client data characters are mapped into efficient block codes for transport within a GFP frame.

The format for GFP frames is shown in FIG. 1. GFP frames are octet-aligned and consist of a GFP core header 11 and, except for GFP Idle frames, a GFP payload area 12. The four octets of the GFP core header 11 consist of a 16-bit PDU length indicator field 13 and a 16-bit core Header Error Check (cHEC) field 14. The two-octet core Header Error Check field 14 contains a CRC-16 error control sequence that protects the integrity of the contents of the core header 11 by enabling both single-bit error correction and multi-bit error detection. The GFP payload area 12 consists of two common components: a payload header 15 and a payload information field 16. An optional payload Frame Check Sequence (pFCS) field 17 is also supported.

The GFP payload header 15 contains two mandatory fields, the type field 151 and the type Header Error Check (tHEC) field 152, and a variable number of additional payload header fields. This group of additional payload header fields is referred to as the extension header 153. The presence of the extension header, and its format, and the presence of the optional pFCS are specified by the type field 151.

The type field 151 is a mandatory two-octet field of the payload header that indicates the content and format of the GFP payload information field. The type field distinguishes between GFP frame types and between different services in a multi-service environment. The type field consists of a Payload Type Identifier (PTI), a Payload FCS Indicator (PFI), an Extension Header Identifier (EXI) and a User Payload Identifier (UPI). The two-octet type Header Error Check (tHEC) field 152 contains a CRC-16 error control sequence that protects the integrity of the contents of the type field and tHEC field by enabling both single-bit error correction and multi-bit error detection.

Three kinds of extension headers are currently defined, a null extension header (EXI=0000), a linear extension header (EXI=0001), and a ring extension header (EXI=0010) for further study. When the Extension Header Identifier (EXI) shows that the type of the extension header is a linear frame mode for instance, the extension header field 153 consists of a CID field and a Spare field. The CID is an 8-bit binary number used to indicate one of 256 communication channels at a GFP termination point and the 8-bit Spare field is reserved for future use.

The two-octet extension Header Error Check (eHEC) field 154 contains a CRC-16 error control sequence that protects the integrity of the contents of the extension header field and eHEC field by enabling both single-bit error correction and multi-bit error detection.

The payload information field 16 contains the framed PDU for frame mapped GFP or, in the case of transparent GFP, a group of client signal characters. This variable length field may include from 0 to 65536-X octets, where X is the size of the payload header. This field may include an optional pFCS field 17.

The pFCS is an optional, 4-octet long, frame check sequence. It contains a CRC-32 sequence that protects the contents of the GFP payload information field 16. The pFCS is generated using the CRC-32 generating polynomial (ISO/IEC 3309) $G(X)=X^{32}+X^{26}+X^{23}+X^{22}+X^{16}+X^{12}+X^{11}+X^{10}+X^8+X^7+X^5+X^4+X^2+X+1$, where $X^{32}$ corresponds to the Most Significant Bit (MSB), and 1 corresponds to the Least Significant Bit (LSB).

Data in a GFP frame shall be scrambled before transmitting. In general, the core header 11 is scrambled for DC balanced by an exclusive-OR operation (modulo-2 addition) with the hexadecimal number "B6AB31E0". Whereas all octets in the payload area 12 are scrambled using an $X^{43}+1$ self-synchronous scrambler.

FIG. 2 illustrates the scrambler and descrambler of GFP payload area 12. The descrambler has an error multiplication factor (EMF=2), and every bit error is transformed into two bit errors, the original one and the consequential one, which is 43-bit space apart from the original one and is named as the additional error bit.

In the prior arts, the solution of processing a GFP frame cannot compensate the impact of payload area descrambler error multiplication factor. Thus, it is a great disadvantage that the prior arts cannot correct the additional single-bit error and cannot avoid the loss frame or error frame due to the additional error bit.

SUMMARY OF THE INVENTION

One technical problem to be solved by the present invention is to enable a GFP processor to compensate the impact of payload area descrambler error multiplication factor when tHEC or/and eHEC single-bit error is corrected, i.e., to enable a GFP processor to correct the tHEC or/and eHEC additional single-bit error.

Another technical problem to be solved by the present invention is to enable a GFP processor to correct tHEC or/and eHEC single-bit error.

To solve the above problems, the present invention proposes a method of processing a GFP frame, the method includes the steps of: processing the GFP frame by the compensating process of payload area descrambler error multiplication factor; and processing the GFP frame by the process of tHEC or/and eHEC single-bit error correction.

The present invention further proposes a device of correcting cHEC, tHEC or/and eHEC single-bit error, comprising: a cyclic redundancy check device, for performing cyclic redundancy check on received cHEC, tHEC or/and eHEC data; a storage device, for storing a corresponding relationship table between cyclic redundancy check value and position of single-bit error; and a locating and correcting device, for locating and correcting the cHEC, tHEC or/and eHEC single-bit error according to the cyclic redundancy check value calculated by the cyclic redundancy check device and the corresponding relationship table between the cyclic redundancy check value and the position of single-bit error stored in the storage device.

The present invention further proposes a device of correcting tHEC or/and eHEC additional single-bit error, comprising: a tHEC or/and eHEC additional single-bit error correction mask generating device, for generating a tHEC or/and eHEC additional single-bit error correction mask; and an XOR device, for performing an exclusive-OR operation on the GFP payload with the tHEC or/and eHEC additional single-bit error correction mask so as to correct the tHEC or/and eHEC additional single-bit error.

The present invention further proposes a payload header processor capable of correcting the tHEC or/and eHEC additional single-bit error and correcting the tHEC or/and eHEC single-bit error, comprising: a tHEC or/and eHEC additional single-bit error correction device, for correcting the tHEC or/and eHEC additional single-bit error; a tHEC or/and eHEC single-bit error correction device, for correcting the tHEC or/and eHEC single-bit error of a GFP frame after being processed by the tHEC or/and eHEC additional single-bit error correction device.

The present invention further proposes a GFP receiver capable of correcting the tHEC or/and eHEC additional single-bit error and correcting the tHEC or/and eHEC single-bit error, comprising: a cHEC single-bit error correction device, for correcting a cHEC single-bit error; a payload header processor, for correcting the tHEC or/and eHEC additional single-bit error and correcting the tHEC or/and eHEC single-bit error of a GFP frame after being processed by the cHEC single-bit error correction device and for processing data in each field of the GFP payload header after error correction; and a pFCS processing device, for performing a pFCS check process on payload information field of the GFP frame after being processed by the payload header processor so as to obtain a pFCS check error indication signal.

The present invention further proposes a GFP processor capable of correcting the tHEC or/and eHEC additional single-bit error and correcting the tHEC or/and eHEC single-bit error, comprising: the GFP receiver as above-described, capable of correcting the tHEC or/and eHEC additional single-bit error and correcting the tHEC or/and eHEC single-bit error.

The present invention further proposes an interface device between a network management system and a GFP processor capable of correcting the tHEC or/and eHEC additional single-bit error and correcting the tHEC or/and eHEC single-bit error, comprising: a tHEC or/and eHEC single-bit error correction counting adaptation device, for adapting counting of tHEC or/and eHEC single-bit error correction; a tHEC or/and eHEC additional single-bit error correction counting adaptation device, for adapting counting of tHEC or/and eHEC additional single-bit error correction; and an enable or disable signal adaptation device, for adapting the signal which indicates to enable or disable the compensating process of payload area descrambler error multiplication factor, and is sent out from the network management system, so as to make it adapted to the GFP processor.

The present invention further proposes a network management system, comprising: an enable or disable signal generating device, for generating an enable or disable signal, which indicates to enable or disable the compensating process of payload area descrambler error multiplication factor; a tHEC or/and eHEC single-bit error correction counting device, for counting adapted tHEC or/and eHEC single-bit error correction; and a tHEC or/and eHEC additional single-bit error correction counting device, for counting adapted tHEC or/and eHEC additional single-bit error correction.

According to the present invention, not only a tHEC or/and eHEC single-bit error can be corrected, but also the tHEC or/and eHEC additional single-bit error can also be corrected so that the equipment's dependability and capability of anti-interference are improved significantly.

BRIEF DESCRIPTION ON THE DRAWINGS

The present invention will be more comprehensively appreciated with reference to the following detailed description, taken in conjunction with the accompanying drawings in which.

DESCRIPTION OF THE PREFERRED EMBODIMENTS

Hereinafter, the preferred embodiments of the present invention will be described in detail with reference to the accompanying drawings.

Figure 13:
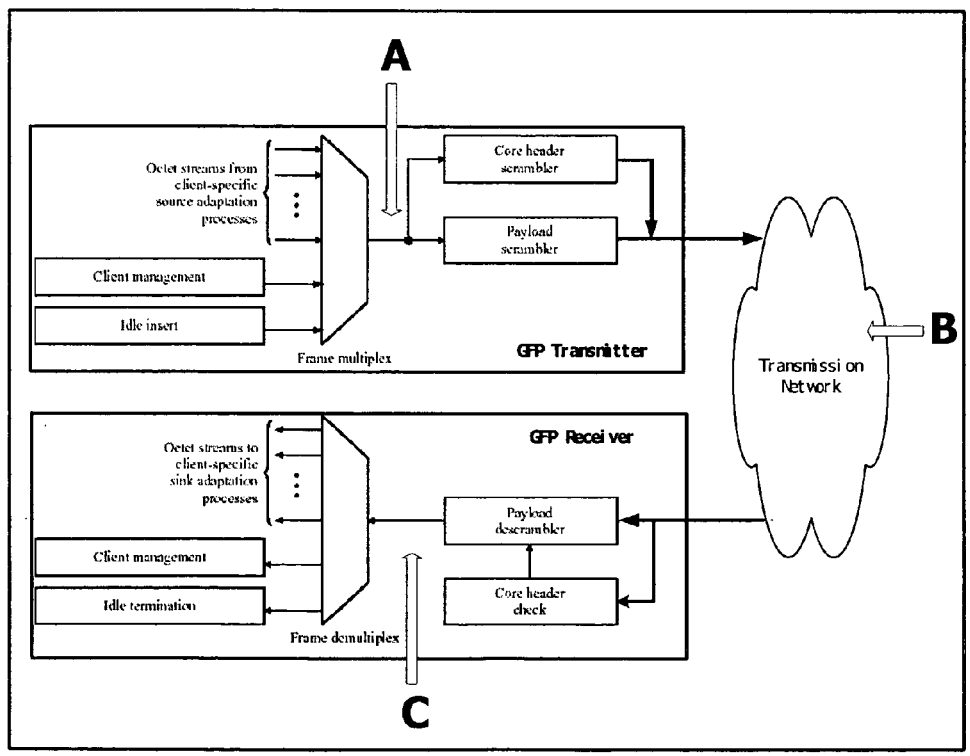
FIG. 13 shows the GFP common (Protocol Independent) procedures.

The GFP common (Protocol Independent) procedures are shown in FIG. 13. The GFP data of location A, location B and location C of FIG. 13 will be described here. Respectively, the location A is before the core header and payload scrambler of a GFP transmitter, the location B is on the transmission network and the location C is after the core header and payload descrambler of a GFP receiver.

As described above, generally, the core header 11 of a GFP frame is scrambled by an exclusive-OR operation with a hexadecimal number "B6AB31E0". Whereas all octets in the payload area 12 are scrambled using an $X^{43}+1$ self-synchronous scrambler.

Therefore, as known from characteristics of the $X^{43}+1$ self-synchronous scrambler, the descrambler of GFP payload area has an error multiplication factor (EMF=2), and every bit error is transformed into two bit errors, the original one and the consequential one, which is 43-bit space apart from the original one and is named as the additional error bit.

There are three kinds of additional single-bit error, shown as below.

1. The tHEC additional single-bit error: due to the error multiplication factor of GFP payload descrambler, an error bit is generated by an exclusive-OR operation with a single-bit error that has been introduced on the transmission network in the type field or tHEC field. This error bit comes from the $43^{rd}$ bit of GFP payload in the payload descrambler.

2. The eHEC additional single-bit error: due to the error multiplication factor of GFP payload descrambler, an error bit is generated by an exclusive-OR operation with a single-bit error that has been introduced on the transmission network in the extension header field or eHEC field. This error bit comes from the $43^{rd}$ bit of GFP payload in the payload descrambler.

3. Payload additional single-bit error: due to the error multiplication factor of GFP payload descrambler, an error bit is generated by an exclusive-OR operation with a single-bit error that has been introduced on the transmission network in the payload field (excluding the payload header). This error bit comes from the $43^{rd}$ bit of GFP payload in the payload descrambler.

When the tHEC or/and eHEC single-bit error occurs (no matter in GFP-T or GFP-F), the tHEC or/and eHEC additional single-bit error may be introduced inside the payload information field, and will be detected by the GFP pFCS (if present), or the MAC FCS (if payload is Ethernet client signal), or HDLC FCS (if payload is HDLC/PPP/IP client), then the frame will be discarded.

Figure 1:
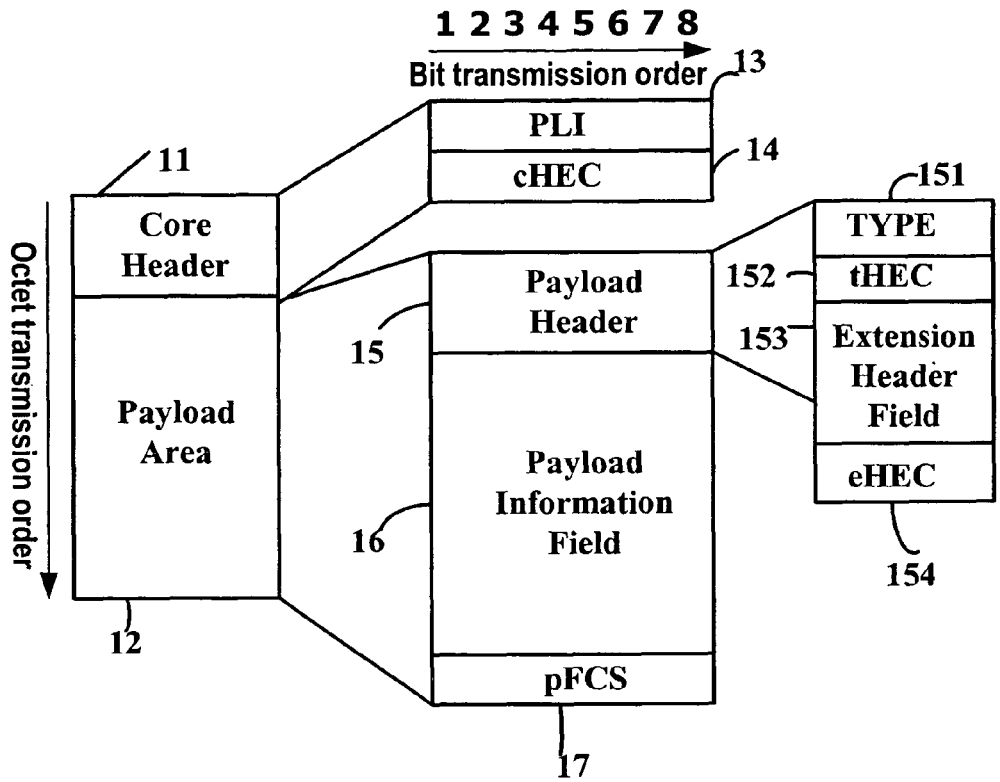
FIG. 1 shows the format for GFP frames.
Figure 2:
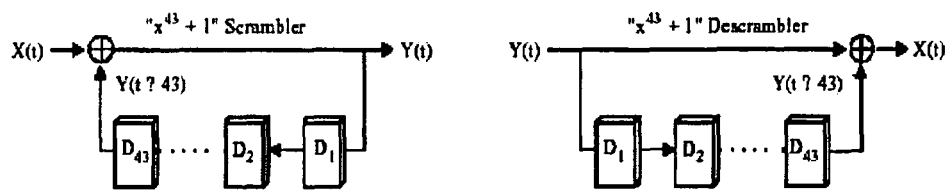
FIG. 2 illustrates the scrambler and descrambler of GFP payload area.
Figure 3:
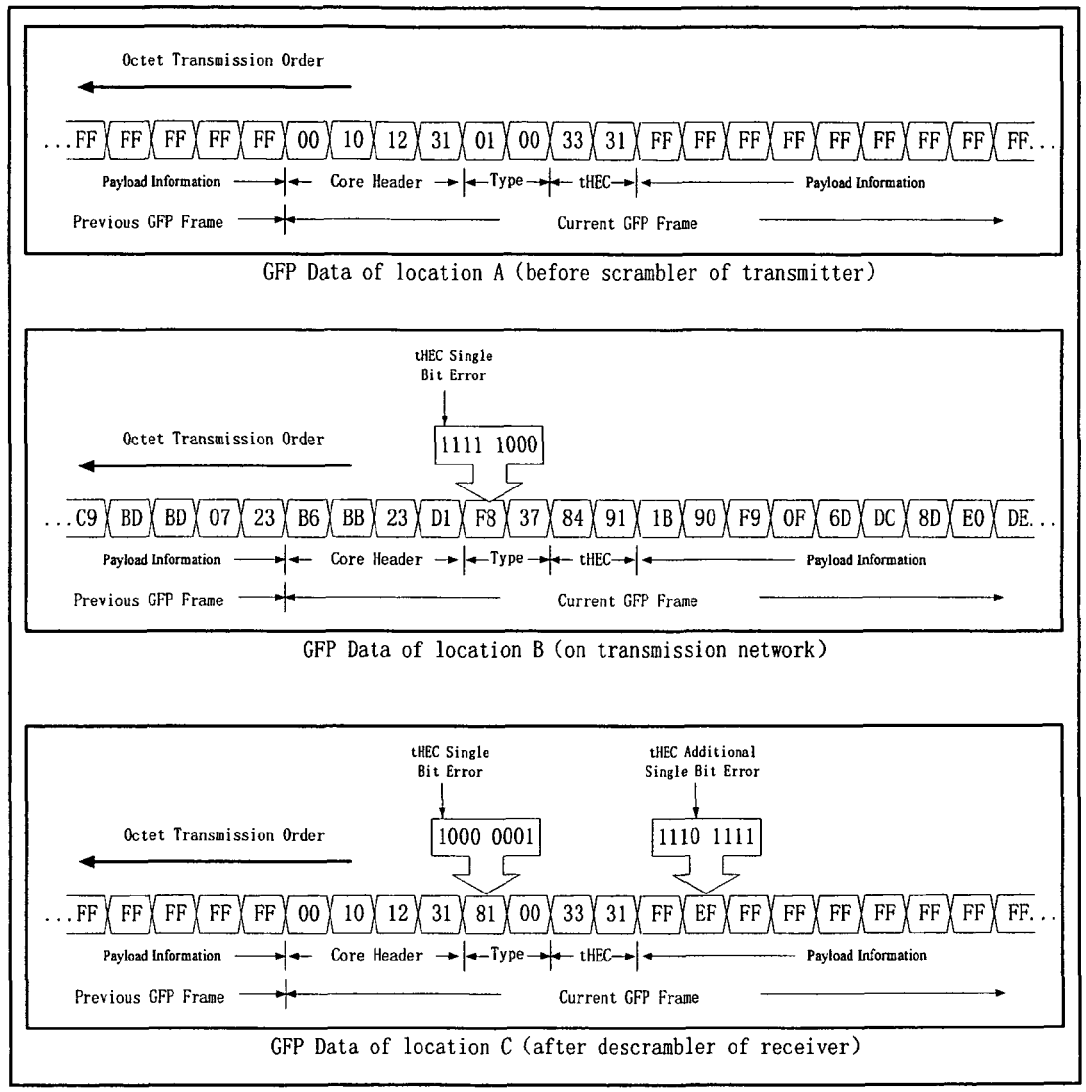
FIG. 3 shows an example of a tHEC single-bit error occurred on the transmission network.

An example of a tHEC single-bit error occurred on the transmission network is presented in FIG. 3. As shown in FIG. 3, there is an error bit in type field on the transmission network (location B), it is a tHEC single-bit error. In location C, besides the original tHEC single-bit error, there is a tHEC additional single-bit error, which locates in the payload information field. This additional single-bit error cannot be corrected, only can be detected by pFCS (if present).

Figure 4:
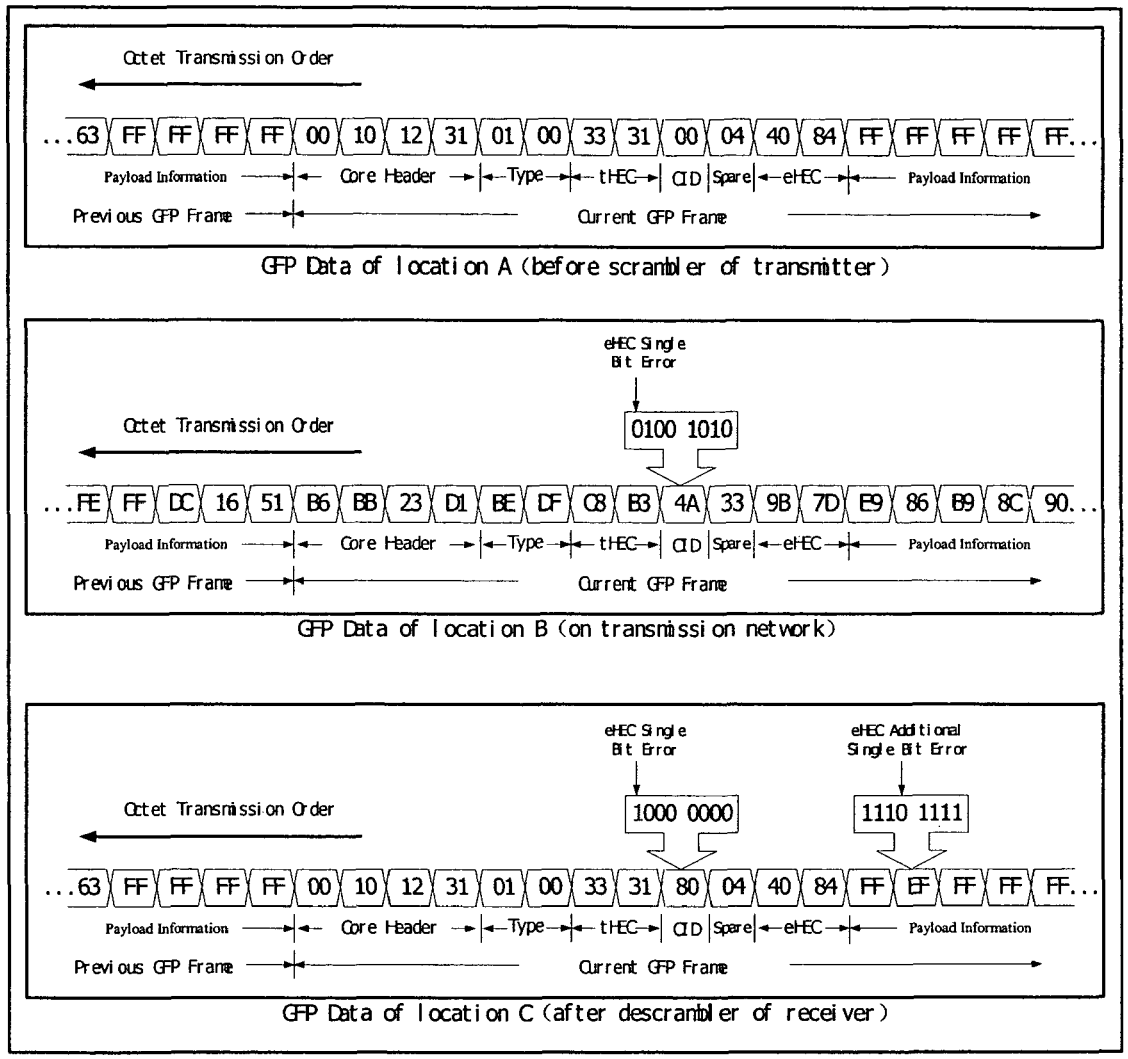
FIG. 4 shows an example of an eHEC single-bit error occurred on the transmission network.

An example of an eHEC single-bit error occurred on the transmission network is presented in FIG. 4. As shown in FIG. 4, there is an error bit in CID field on the transmission network (location B), it is an eHEC single-bit error. In location C, there is an eHEC additional single-bit error, which locates in the payload information field, besides the original eHEC single-bit error. This additional single-bit error cannot be corrected, only can be detected by pFCS (if present).

The tHEC or/and eHEC additional single-bit error will result in some other serious cases, for example:

a. If one tHEC single-bit error occurs in previous GFP frame and another occurs in current GFP frame on the network, in the GFP receiver, the additional single-bit error generated by the original tHEC error bit of previous frame may locate in the area protected by tHEC of current frame when the payload information length is short enough. So, including the original tHEC single-bit error, there are two error bits in the area protected by tHEC of current frame, this is the case of multi-bit error of tHEC, the current GFP frame will be discarded.

b. In one GFP frame, if a tHEC single-bit error and an eHEC single-bit error occur on the network, then in the GFP receiver, the additional single-bit error generated by original tHEC error may locate in the area protected by eHEC. So, including the original eHEC single-bit error, there are two error bits in the area protected by eHEC, this is the case of multi-bit error of eHEC, and this GFP frame will be discarded.

A tHEC or eHEC single-bit error may occur not only because of an error bit introduced on the transmission network in the tHEC or eHEC processing field but also because of the error multiplication factor of an error bit introduced 43 bits before, as described as follows.

If an error bit locates in the last 43 bits of payload area (excluding payload header) of previous GFP frame, in this case, a payload additional single-bit error will occur after the payload descrambler.

The payload additional single-bit error may become one tHEC or/and eHEC single-bit error when it locates in the tHEC or/and eHEC processing field (i.e. type and tHEC fields for tHEC processing or extension header and eHEC fields for eHEC processing) of the current GFP frame. And in this case, the tHEC or eHEC additional single-bit error does not exist.

Figure 5:
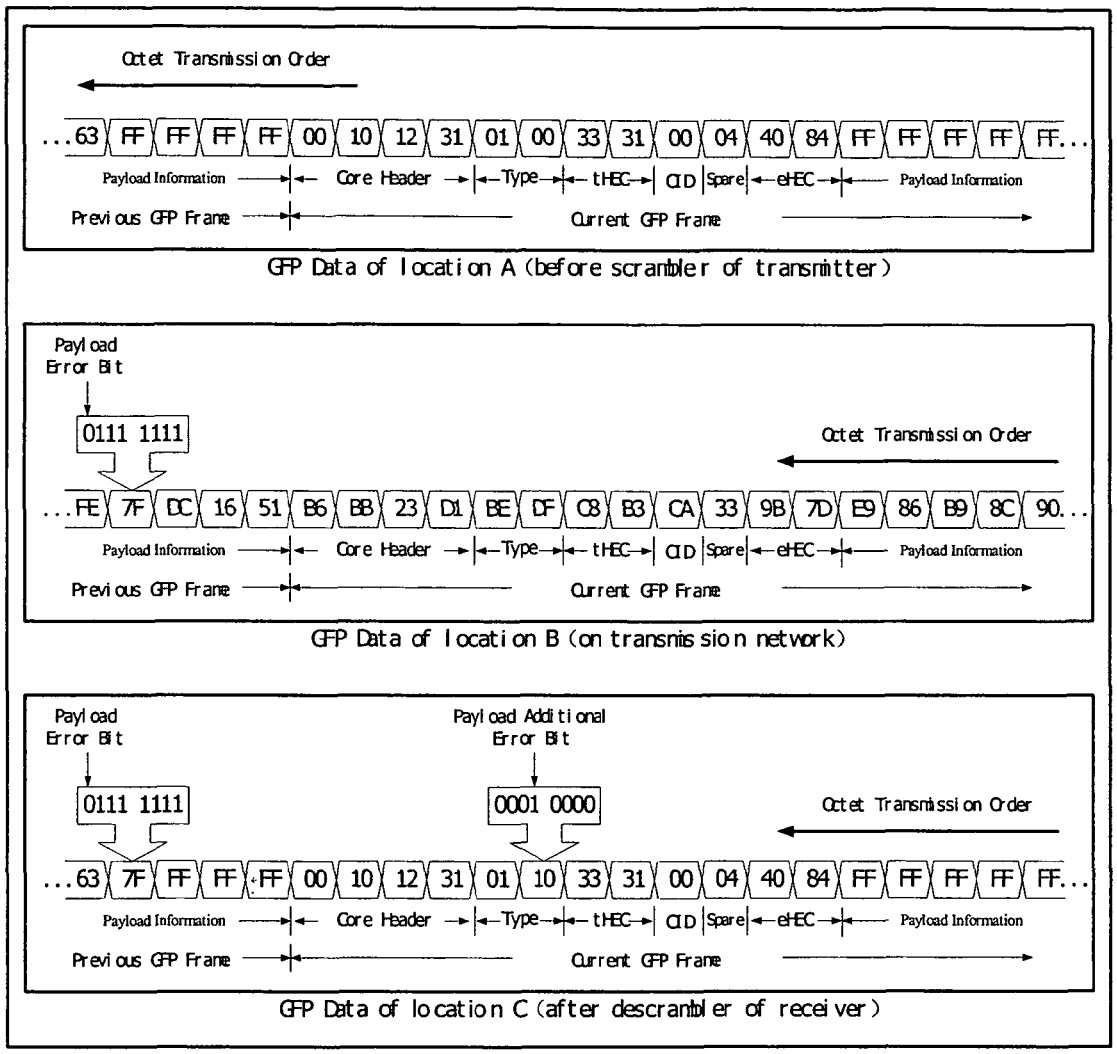
FIG. 5 shows an example of payload additional single-bit error becoming one tHEC single-bit error.

An example of payload additional single-bit error becoming one tHEC single-bit error is presented in FIG. 5.

In view of the above-described reasons, in an embodiment according to the present invention, it is judged whether or not pFCS of a previous GFP frame (excluding Idle frame) is enabled. The pFCS can be the payload Frame Check Sequence of GFP frame or the other Frame Check Sequence of GFP client payload, for example, the MAC FCS (if payload is Ethernet client signal), or HDLC FCS (if payload is HDLC/PPP/IP client), etc. If the pFCS is not enabled, it is deemed that the compensating process of payload area descrambler error multiplication factor is disabled in the current GFP frame; if the pFCS is enabled, the result of the previous GFP frame (excluding Idle frames) pFCS calculation is judged. If the result shows that the payload information field has no error bit, it is deemed that the tHEC or/and eHEC single-bit error of the current GFP will bring about a tHEC or/and eHEC additional single-bit error, and this tHEC or/and eHEC additional single-bit error should be corrected by the compensating process of payload area descrambler error multiplication factor. If the result shows that the payload information field has an error bit, it is deemed that the compensating process of payload area descrambler error multiplication factor is disabled in the current GFP frame.

In an embodiment according to the present invention, the compensating process of payload area descrambler error multiplication factor, i.e., the process of the tHEC or/and eHEC additional single-bit error correction is controlled by a network management system using a mode controlling signal. For instance, if the mode controlling signal is 0, the process of the tHEC or/and eHEC additional single-bit error correction is disabled; if the mode controlling signal is 1, the process of the tHEC or/and eHEC additional single-bit error correction is enabled. Of course, those skilled in the art shall appreciate that there is also no need for a network management system, i.e., the process of the tHEC or/and eHEC additional single-bit error correction can be fixed to enable or to disable.

According to GFP protocols, the cHEC, tHEC and eHEC each includes a CRC-16 error control sequence. The CRC-16 error control sequence is calculated by the entire data (i.e. data in PDU length indicator field, type field and extension header field, respectively). Generally, the generating polynomial of each CRC-16 error control sequence is $G(x)=x^{16}+x^{12}+x^5+1$, where $x^{16}$ corresponds to the Most Significant Bit (MSB) and $x^0$, i.e., 1 corresponds to the Least Significant Bit (LSB). At the GFP transmitting side, CRC-16 calculation is performed on the data to obtain cHEC, tHEC and eHEC, respectively. Then, the obtained cHEC, tHEC and eHEC are inserted into a position of two octets next to the data, respectively.

In an embodiment according to the present invention, a core header single-bit error is located and corrected in such a manner that, the core header single-bit error is located and corrected according to CRC check result, Table 1 and Table 2.

TABLE 1

Received cHEC field has no error while data has single-bit error

| | Error position of Data | | | | | | |
|---|---|---|---|---|---|---|---|
| D15 | D14 | D13 | D12 | D11 | D10 | D9 | D8 |
| CRC check value | | | | | | | |
| DD38 | 6E9C | 374E | 1BA7 | 85C3 | CAF1 | ED68 | 76B4 |

| | Error position of Data | | | | | | |
|---|---|---|---|---|---|---|---|
| D7 | D6 | D5 | D4 | D3 | D2 | D1 | D0 |
| CRC check value | | | | | | | |
| 3B5A | 1DAD | 86C6 | 4363 | A9A1 | DCC0 | 6E60 | 3730 |

TABLE 2

Received data has no error while cHEC field has single-bit error

| | Error position of cHEC | | | | | | |
|---|---|---|---|---|---|---|---|
| H15 | H14 | H13 | H12 | H11 | H10 | H9 | H8 |
| CRC check value | | | | | | | |
| 1B98 | 0DCC | 06E6 | 0373 | 89A9 | CCC4 | 6662 | 3331 |

| | Error position of cHEC | | | | | | |
|---|---|---|---|---|---|---|---|
| H7 | H6 | H5 | H4 | H3 | H2 | H1 | H0 |
| CRC check value | | | | | | | |
| 9188 | 48C4 | 2462 | 1231 | 8108 | 4084 | 2042 | 1021 |

If the CRC check value is 0, it represents that there is no error bit. If the CRC check value is one of the 32 special values in Table 1 or 2 (the values in the tables are hexadecimal), the corresponding bit in the table is located as an error bit, and this single-bit error is inverted (from 0 to 1 or from 1 to 0) so as to complete the error-correcting operation. If the CRC check value is not 0 and not any one of the 32 special values in Table 1 or 2, it is deemed that core header multi-bit error occurs and cannot be corrected.

D15-D0 represents the 15th bit to 0th bit of the data, i.e. 15th bit to 0th bit of the PLI 13, and H15-H0 represents the 15th bit to 0th bit of cHEC field corresponding to the data.

The location and correction of the tHEC single-bit error, or the eHEC single-bit error is the same as above described, the detailed description thereof is omitted here for the purpose of concision.

According to an embodiment of the present invention, the method of processing a GFP frame is as follows: first, the GFP frame is processed by the compensating process of payload area descrambler error multiplication factor, i.e., correcting the tHEC or/and eHEC additional single-bit error; and then, the GFP frame is processed by the tHEC or/and eHEC single-bit error correction process. That is, the first level of single-bit error correction corrects the tHEC or/and eHEC additional single-bit error brought about by the payload area descrambler error multiplication factor. And the second level of single-bit error correction corrects the tHEC or/and eHEC single-bit error. A data stream received by a GFP receiver first is processed by the tHEC or/and eHEC additional single-bit error correction device and then is processed by the tHEC or/and eHEC single-bit error correction device.

For instance, a GFP frame entering the tHEC or/and eHEC additional single-bit error correction device is performed an exclusive-OR operation with a tHEC or/and eHEC additional single-bit error correction mask, 8 bits for example, so as to accomplish the function of tHEC or/and eHEC additional single-bit error correction.

According to an embodiment of the present invention, the tHEC or/and eHEC additional single-bit error correction mask is generated according to a tHEC or/and eHEC single-bit error position indication signal, an input data valid indication signal, a pFCS enabling signal and a pFCS check error indication signal.

According to an embodiment of the present invention, the tHEC or/and eHEC additional single-bit error correction mask is generated further in accordance with an enable or disable signal, i.e., a mode controlling signal, which indicates to enable or disable the compensating process of payload area descrambler error multiplication factor.

The tHEC or/and eHEC single-bit error position indication signal is used to indicate the tHEC or/and eHEC single-bit error occurs at which bit of the four octets related to the tHEC or/and eHEC.

The input data valid indication signal is used to indicate whether or not the current GFP data is GFP payload area data.

The pFCS enabling signal is used to indicate whether pFCS of the previous GFP frame (excluding Idle frames) is enabled when tHEC or/and eHEC additional single-bit error correction is performed on the current GFP frame. For instance, 0 represents that pFCS is not enabled, and 1 represents that pFCS is enabled.

The pFCS check error indication signal is used to indicate the check result of pFCS of the previous frame (excluding Idle frames) when tHEC or/and eHEC additional single-bit error correction is performed on the current GFP frame. For instance, 0 represents that it has no error, and 1 represents that it has an error.

Figure 6A:
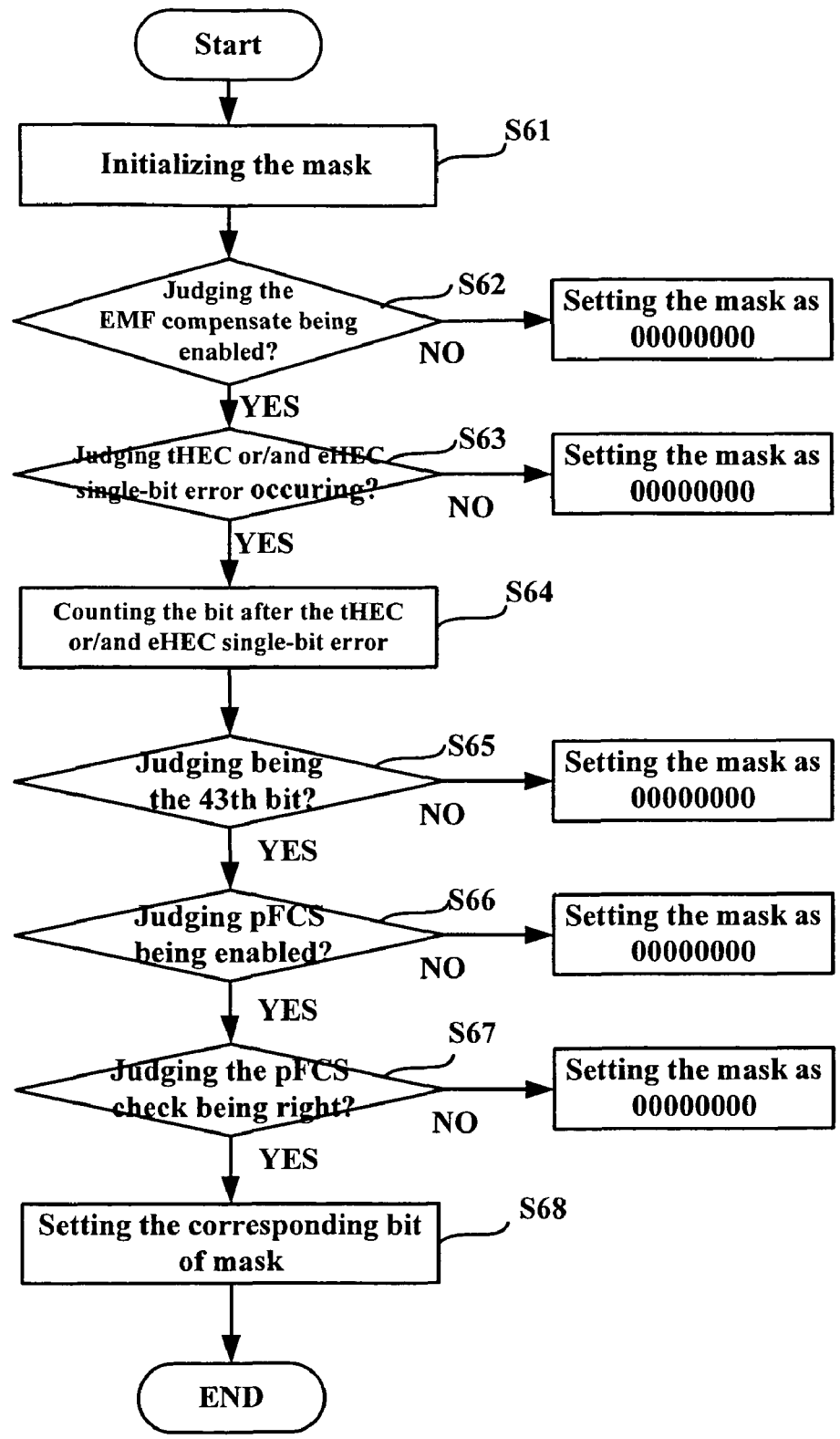
FIG. 6A illustrates the generating process of a tHEC or/and eHEC additional single-bit error correction mask according to an embodiment of the present invention.

FIG. 6A illustrates the generating process of a tHEC or/and eHEC additional single-bit error correction mask according to an embodiment of the present invention.

As illustrated in the FIG. 6A, the flow starts with "Start" and enters Step S61 immediately.

In Step S61, the mask is initialized, for example, it is initialized as 00000000, and then the flow enters Step S62.

In Step S62, it is judged whether the compensating process of payload area descrambler error multiplication factor is enabled. When it is not, the mask is set as 00000000. When it is, Step S63 is entered.

In Step S63, it is judged whether there is a tHEC or/and eHEC single-bit error. When there is no tHEC or/and eHEC single-bit error, the mask is set as 00000000. When there is, Step S64 is entered.

In Step S64, the bit of input payload data after the tHEC or/and eHEC single-bit error is counted. Then, Step S65 is entered.

In Step S65, it is judged whether to be the 43rd bit of the input payload data after the tHEC or/and eHEC single-bit error. If not, the mask is set as 00000000, for example. If so, Step S66 is entered.

In Step S66, it is judged whether or not pFCS in the previous frame (excluding Idle frames) is enabled. If not, the mask is set as 00000000, for example. If so, Step S67 is entered.

In Step S67, it is judged whether pFCS check result in the previous frame (excluding Idle frames) is right or wrong. If wrong, for example, the mask is set as 00000000. If right, Step S68 is entered. In Step S68, a bit of the mask is set as 1, for example, and the process is ended.

In another embodiment according to the present invention, there are two paths in parallel to process the GFP frame. In path A (the first path), the process of the tHEC or/and eHEC additional single-bit error correction is fixed to enable, i.e., in this path, the first level of single-bit error correction corrects the tHEC or/and eHEC additional single-bit error brought about by the payload area descrambler error multiplication factor, and the second level of single-bit error correction corrects the tHEC or/and eHEC single-bit error.

However, in this path A, the tHEC or/and eHEC additional single-bit error correction mask is generated only according to a tHEC or/and eHEC single-bit error position indication signal, an input data valid indication signal.

Figure 6B:
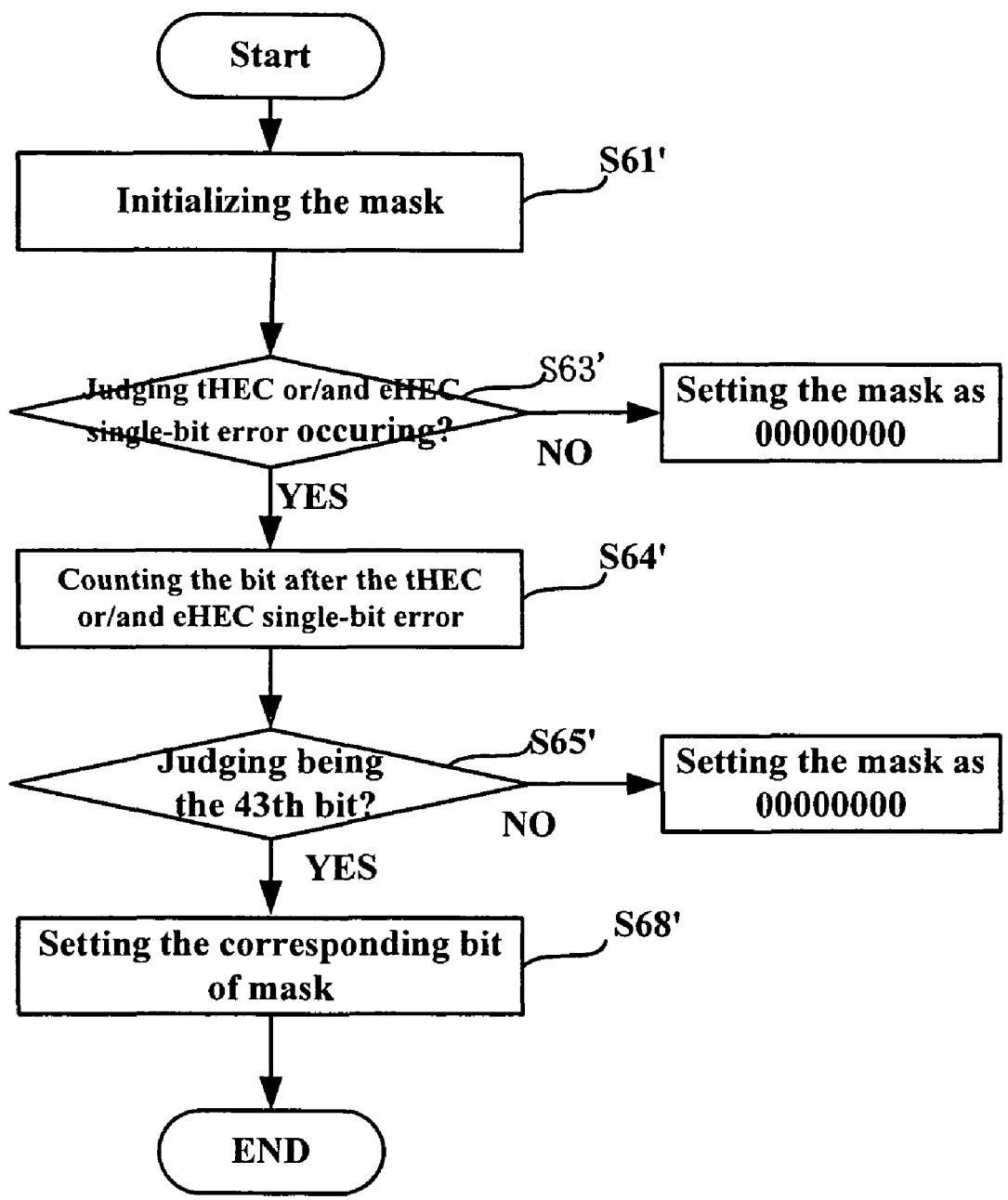
FIG. 6B illustrates the generating process of a tHEC or/and eHEC additional single-bit error correction mask according to another embodiment of the present invention.

FIG. 6B illustrates the generating process of a tHEC or/and eHEC additional single-bit error correction mask in this case.

As illustrated in the FIG. 6B, the flow starts with "Start" and enters Step S61' immediately.

In Step S61', the mask is initialized, for example, it is initialized as 00000000, and then the flow enters Step S63'.

In Step S63', it is judged whether there is a tHEC or/and eHEC single-bit error. When there is no tHEC or/and eHEC single-bit error, the mask is set as 00000000. When there is, Step S64' is entered.

In Step S64', the bit of input payload data after the tHEC or/and eHEC single-bit error is counted. Then, Step S65' is entered.

In Step S65', it is judged whether to be the 43rd bit of the input payload data after the tHEC or/and eHEC single-bit error. If not, the mask is set as 00000000, for example. If so, Step S68' is entered.

In Step S68', a bit of the mask is set as 1, for example, and the process is ended.

In path B (the second path), the process of the tHEC or/and eHEC additional single-bit error correction is fixed to disable, i.e., in this path B, there is only one level of single-bit error correction.

In each path, it includes: a GFP frame buffer, for storing a GFP frame; checking device, for checking whether pFCS is enabled in the GFP frame; and processing device, for performing pFCS check on the payload, so as to obtain pFCS check error indication signal. The GFP frame of which path will be selected is decided by the pFCS check result of the GFP frame performed in each path. Only in the following case, i.e., if the pFCS check error indication signal shows the GFP frame (excluding payload header) has no error bit only in one path, the GFP frame of this path without an error bit will be selected. In other cases, the GFP frame of path B (the second path) will be selected.

Figure 7:
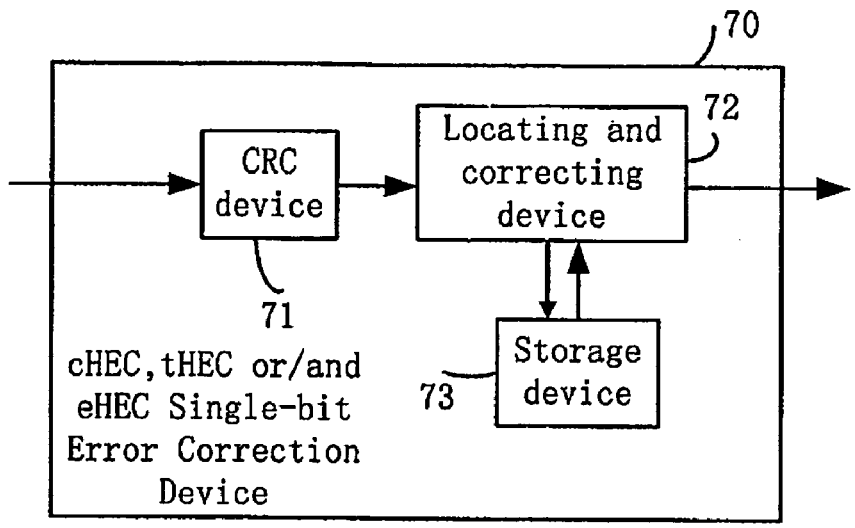
FIG. 7 illustrates a device of correcting cHEC, tHEC or eHEC single-bit error according to an embodiment of the present invention.

FIG. 7 illustrates a device of correcting cHEC, tHEC or eHEC single-bit error according to an embodiment of the present invention.

As illustrated in FIG. 7, the device 70 of correcting cHEC, tHEC or eHEC single-bit error comprises: a cyclic redundancy check device 71, for performing cyclic redundancy check on received cHEC, tHEC or eHEC, and the corresponding data; a storage device 73, for storing a corresponding relationship table between cyclic redundancy check value and position of single-bit error; and a locating and correcting device 72, for locating and correcting cHEC, tHEC or eHEC single-bit error on the basis of the cyclic redundancy check value calculated by the cyclic redundancy check device and the corresponding relationship table between the cyclic redundancy check check value and the position of single-bit error as stored in the storage device 73.

As described above, if the CRC check value of the cyclic redundancy check device 71 is 0, it represents that there is no error bit. If the CRC check value is one of the 32 special values in Table 1 or 2 (values in the tables are hexadecimal) as stored in the storage device 73, then the locating and correcting device 72 locates the corresponding bit in the table as an error bit, and the single-bit error is inverted (from 0 to 1, or from 1 to 0) so as complete the operation of single-bit error correction. If the CRC check value is not 0, and not any one of the 32 special values in Table 1 or 2, then it is deemed that multi-bit error occurs and cannot be corrected.

Figure 8A:
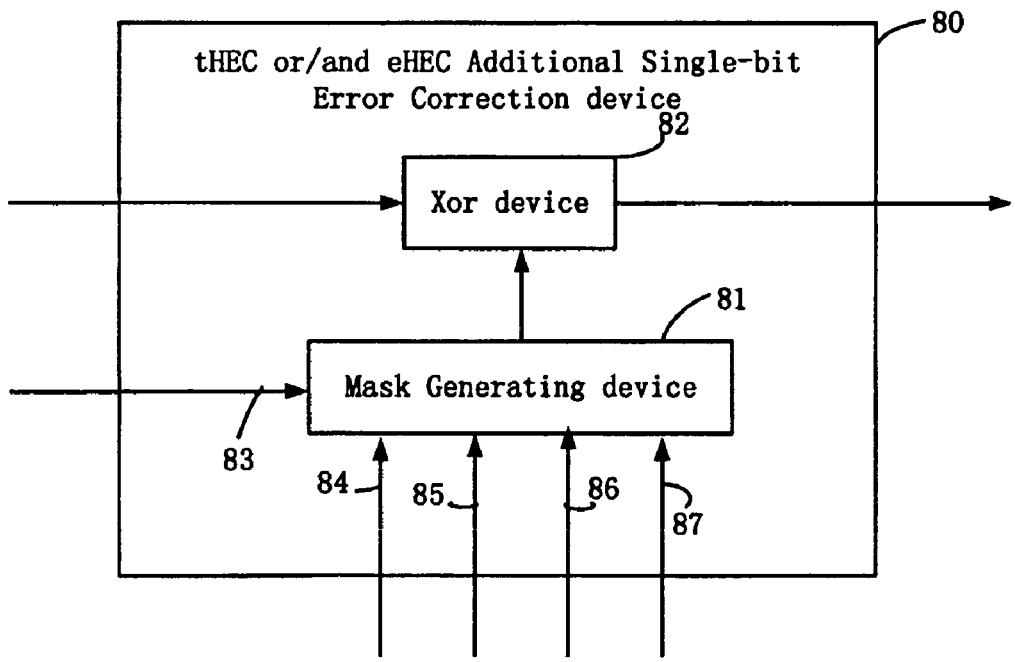
FIG. 8A illustrates a device of correcting tHEC or/and eHEC additional single-bit error according to an embodiment of the present invention.

FIG. 8A illustrates a device 80 of correcting tHEC or/and eHEC additional single-bit error according to an embodiment of the present invention.

As illustrated in FIG. 8A, the device 80 of correcting tHEC or/and eHEC additional single-bit error comprises: a tHEC or/and eHEC additional single-bit error correction mask generating device 81, for generating the tHEC or/and eHEC additional single-bit error correction mask; and an xor device 82, for performing an exclusive-OR operation on the GFP payload with the tHEC or/and eHEC additional single-bit error correction mask so as to correct the tHEC or/and eHEC additional single-bit error.

According to the embodiment of the present invention, the tHEC or/and eHEC additional single-bit error correction mask is generated according to an enable or disable signal 83, which indicates to enable or disable the compensating process of payload area descrambler error multiplication factor, a tHEC or/and eHEC single-bit error position indication signal 84, an input data valid indication signal 85, a pFCS enabling signal 86 and a pFCS check error indication signal 87.

For instance, the mask is 8-bit and is initialized to all 0s. A bit of the tHEC or/and eHEC additional single-bit error correction mask is set to 1 only if the compensating process of payload area descrambler error multiplication factor is enabled, it is the 43rd bit of input payload data after the tHEC or/and eHEC single-bit error, the pFCS of the previous GFP frame is enabled and the check result of the pFCS of the previous GFP frame shows it has no error.

Figure 8B:
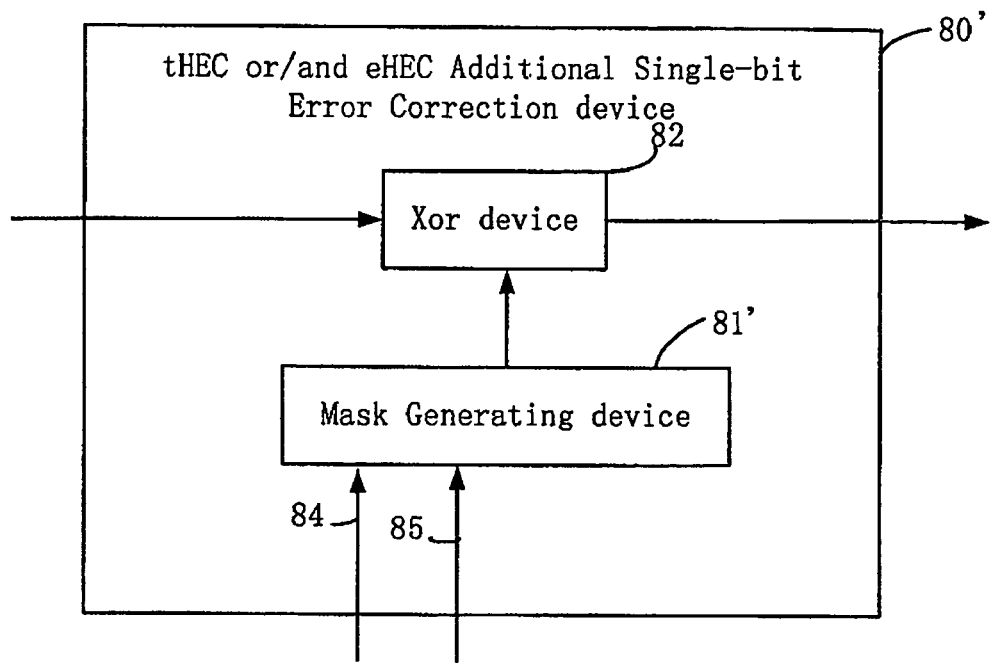
FIG. 8B illustrates a device of correcting tHEC or/and eHEC additional single-bit error according to another embodiment of the present invention.

FIG. 8B illustrates a device 80' of correcting tHEC or/and eHEC additional single-bit error according to another embodiment of the present invention.

As illustrated in FIG. 8B, the device 80' of correcting tHEC or/and eHEC additional single-bit error comprises: a tHEC or/and eHEC additional single-bit error correction mask generating device 81', for generating the tHEC or/and eHEC additional single-bit error correction mask; and an xor device 82, for performing an exclusive-OR operation on the GFP payload with the tHEC or/and eHEC additional single-bit error correction mask so as to correct the tHEC or/and eHEC additional single-bit error.

According to the embodiment of the present invention, the tHEC or/and eHEC additional single-bit error correction mask is generated according to a tHEC or/and eHEC single-bit error position indication signal 84, an input data valid indication signal 85.

For instance, the mask is 8-bit and is initialized to all 0s. A bit of the tHEC or/and eHEC additional single-bit error correction mask is set to 1 only if it is the 43rd bit of input payload data after the tHEC or/and eHEC single-bit error.

Figure 9A:
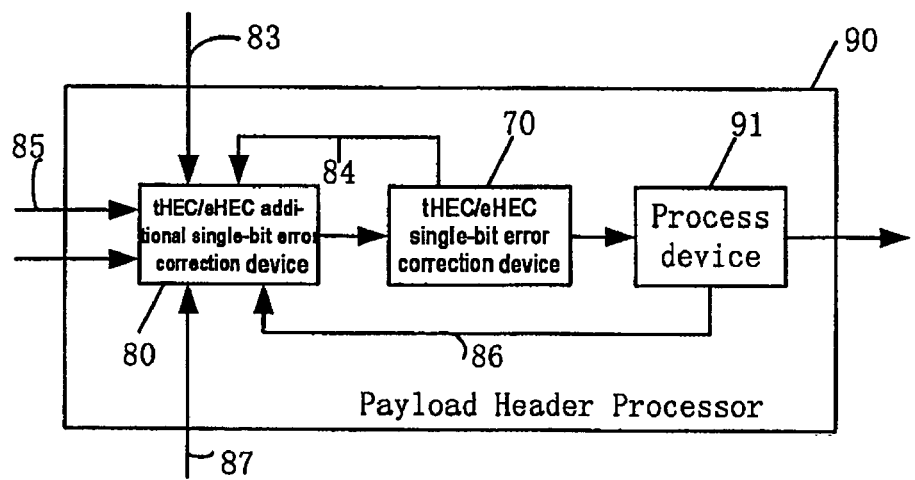
FIG. 9A illustrates a payload header processor capable of correcting the tHEC or/and eHEC additional single-bit error and correcting the tHEC or/and eHEC single-bit error according to an embodiment of the present invention.

FIG. 9A illustrates a payload header processor capable of correcting the tHEC or/and eHEC additional single-bit error and correcting the tHEC or/and eHEC single-bit error according to an embodiment of the present invention.

As illustrated in FIG. 9A, the payload header processor 90 capable of correcting the tHEC or/and eHEC additional single-bit error and correcting the tHEC or/and eHEC single-bit error comprises: the device 80 of correcting tHEC or/and eHEC additional single-bit error, for correcting a tHEC or/and eHEC additional single-bit error; the device 70 of correcting tHEC or/and eHEC single-bit error, for correcting a tHEC or/and eHEC single-bit error of a GFP frame after being processed by the device 80 of correcting tHEC or/and eHEC additional single-bit error; a payload header data processing device 91, for processing data in each field of a GFP payload header of the GFP frame after being processed by the device 70 of correcting tHEC or/and eHEC single-bit error, so as to provide pFCS enabling indication signal to the device 80 of correcting tHEC or/and eHEC additional single-bit error.

Figure 9B:
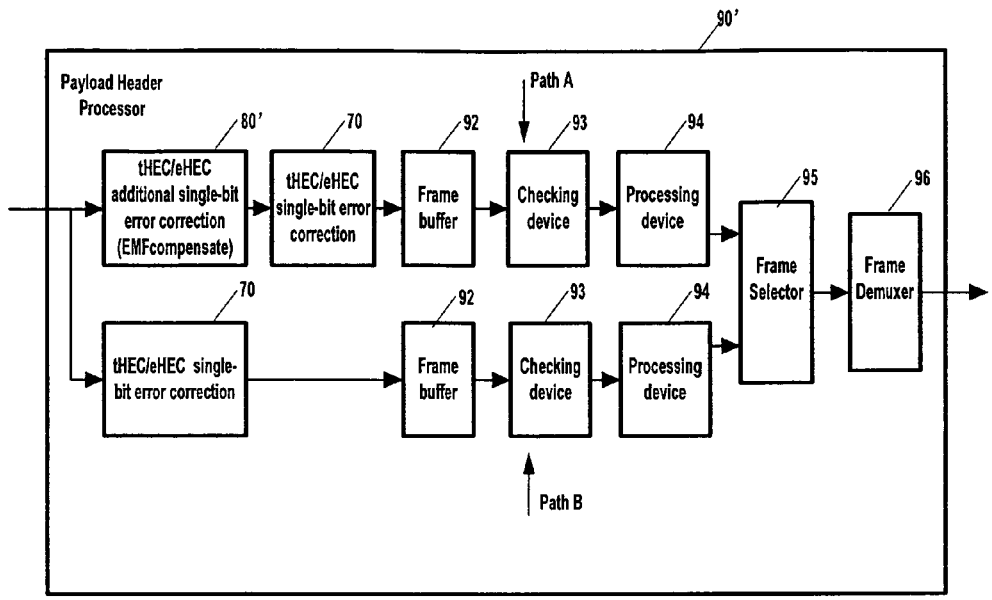
FIG. 9B illustrates a payload header processor capable of correcting the tHEC or/and eHEC additional single-bit error and correcting the tHEC or/and eHEC single-bit error according to another embodiment of the present invention.

FIG. 9B illustrates a payload header processor capable of correcting the tHEC or/and eHEC additional single-bit error and correcting the tHEC or/and eHEC single-bit error according to another embodiment of the present invention.

As illustrated in FIG. 9B, the payload header processor 90' capable of correcting the tHEC or/and eHEC additional single-bit error and correcting the tHEC or/and eHEC single-bit error comprises two paths, path A (the first path) and path B (the second path).

The first path comprises the device 80' of correcting tHEC or/and eHEC additional single-bit error, for correcting a tHEC or/and eHEC additional single-bit error; the device 70 of correcting tHEC or/and eHEC single-bit error, for correcting a tHEC or/and eHEC single-bit error of a GFP frame after being proposed by the device 80' of correcting tHEC or/and eHEC additional single-bit error; a GFP frame buffer 92, which stores the GFP frame after being processed by the device 70 of correcting tHEC or/and eHEC single-bit error temporarily; a checking device 93, for checking whether pFCS is enabled in the GFP frame on the buffer 92; and a processing device 94, for performing pFCS check on the payload information field of the GFP frame (if pFCS is enabled in the GFP frame) to indicate whether the GFP payload (excluding payload header) has an error bit.

The second path comprises the device 70 of correcting tHEC or/and eHEC single-bit error, for correcting a tHEC or/and eHEC single-bit error of a GFP frame; a GFP frame buffer 92, which stores the GFP frame after being processed by the device 70 of correcting tHEC or/and eHEC single-bit error temporarily; a checking device 93, for checking whether pFCS is enabled in the GFP frame on the buffer 92; and a processing device 94, for performing pFCS check on the payload information field of the GFP frame (if pFCS is enabled in the GFP frame) to indicate whether the GFP payload (excluding payload header) has an error bit.

The device 90' further comprises a frame selector 95. The frame selector 95 selects the GFP frame of one of the two paths to be further processed by the additional device, such as Frame Demuxer 96.

The GFP frame of which path will be selected by the frame selector 95 is decided by the pFCS check result of the GFP frame performed in each path. Only in the following case, i.e., if the pFCS check error indication signal shows the GFP frame (excluding payload header) has no error bit only in one path, the GFP frame of this path without an error bit will be selected. In other cases, GFP frame of the second path will be selected.

The difference between the device 80' and 80 capable of correcting a tHEC or/and eHEC additional single-bit error is that, in device 80', the tHEC or/and eHEC additional single-bit error correction mask is generated only according to a tHEC or/and eHEC single-bit error position indication signal, and an input data valid indication signal.

Figure 10A:
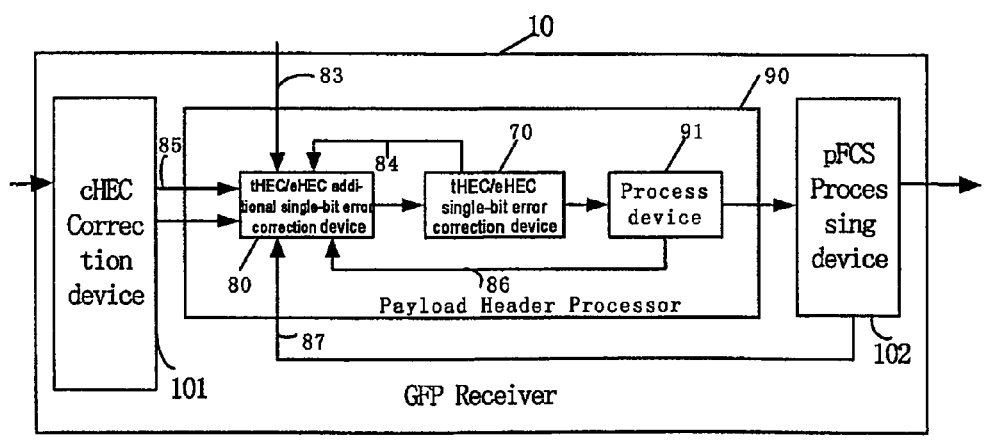
FIG. 10A illustrates a GFP receiver capable of correcting the tHEC or/and eHEC additional single-bit error and correcting the tHEC or/and eHEC single-bit error according to an embodiment of the present invention.

FIG. 10A illustrates a GFP receiver capable of correcting the tHEC or/and eHEC additional single-bit error and correcting the tHEC or/and eHEC single-bit error according to an embodiment of the present invention.

As illustrated in FIG. 10A, the GFP receiver 10 capable of correcting the tHEC or/and eHEC additional single-bit error and correcting the tHEC or/and eHEC single-bit error comprises: a cHEC single-bit error correction device 101, for correcting a cHEC single-bit error; the payload header processor 90, for correcting the tHEC or/and eHEC additional single-bit error and correcting the tHEC or/and eHEC single-bit error of a GFP frame after being processed by the cHEC single-bit error correction device 101 and for processing data in each field of the GFP payload header; a pFCS processing device 102, for performing pFCS check process on the payload of the GFP frame after being processed by the payload header processor, so as to obtain pFCS check error indication signal, and provide the indication signal to the device 80 of correcting tHEC or/and eHEC additional single-bit error.

Figure 10B:
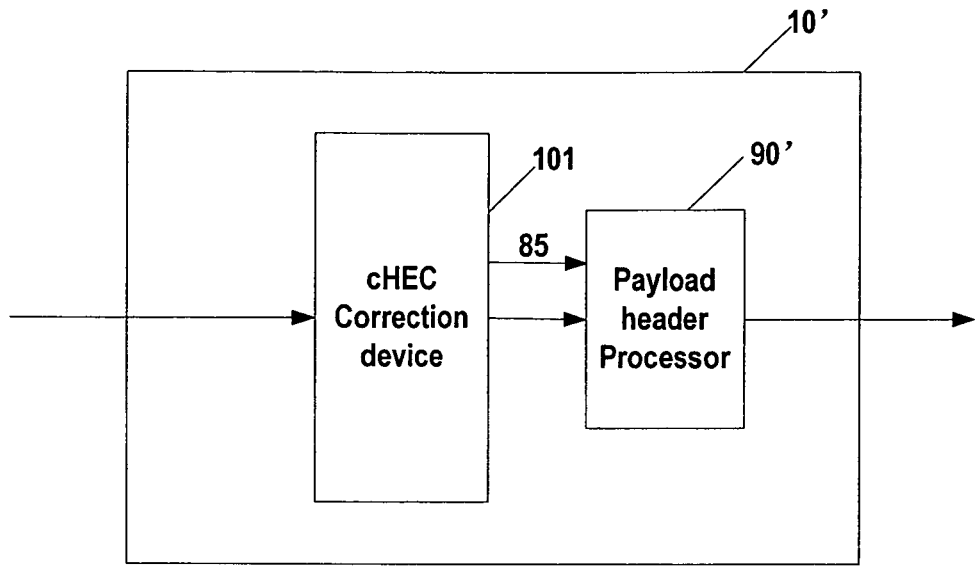
FIG. 10B illustrates a GFP receiver capable of correcting the tHEC or/and eHEC additional single-bit error and correcting the tHEC or/and eHEC single-bit error according to another embodiment of the present invention.

FIG. 10B illustrates a GFP receiver capable of correcting the tHEC or/and eHEC additional single-bit error and correcting the tHEC or/and eHEC single-bit error according to another embodiment of the present invention.

As illustrated in FIG. 10B, the GFP receiver 10' capable of correcting the tHEC or/and eHEC additional single-bit error and correcting the tHEC or/and eHEC single-bit error comprises: a cHEC single-bit error correction device 101, for correcting a cHEC single-bit error; the payload header processor 90', for correcting the tHEC or/and eHEC additional single-bit error and correcting the tHEC or/and eHEC single-bit error of a GFP frame after being processed by the cHEC single-bit error correction device 101.

According to an embodiment of the present invention, a GFP processor capable of correcting the tHEC or/and eHEC additional single-bit error and correcting the tHEC or/and eHEC single-bit error comprises: the GFP receiver capable of correcting the tHEC or/and eHEC additional single-bit error and correcting the tHEC or/and eHEC single-bit error; and a GFP transmitter, for transmitting a GFP frame.

Figure 11:
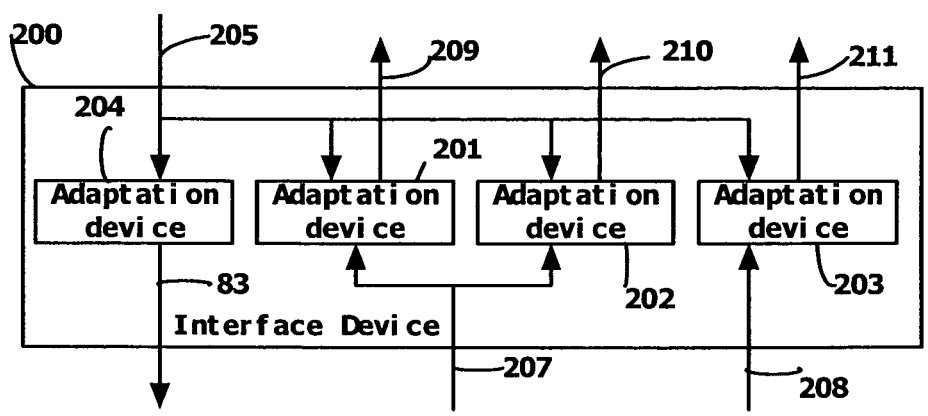
FIG. 11 illustrates an interface device between a network management system and a GFP processor capable of correcting the tHEC or/and eHEC additional single-bit error and correcting the tHEC or/and eHEC single-bit error, according to an embodiment of the present invention.

FIG. 11 illustrates an interface device between a network management system and a GFP processor capable of correcting the tHEC or/and eHEC additional single-bit error and correcting the tHEC or/and eHEC single-bit error, according to an embodiment of the present invention.

As illustrated in FIG. 11, the interface device 200 between a network management system and a GFP processor capable of correcting the tHEC or/and eHEC additional single-bit error and correcting the tHEC or/and eHEC single-bit error comprises:

tHEC or/and eHEC single-bit error correction counting adaptation devices 201 and 202, for adapting tHEC or/and eHEC single-bit error correction counting 207 provided by the device of correcting tHEC or/and eHEC single-bit error, under the control of an enable or disable signal 205, which indicates to enable or disable the compensating process of payload area descrambler error multiplication factor, from the network management system, wherein the tHEC or/and eHEC single-bit error correction counting adaptation device 201 adapts the tHEC or/and eHEC single-bit error correction counting 207 if the signal 205 indicates to disable the compensating process of payload area descrambler error multiplication factor, however, the tHEC or/and eHEC single-bit error correction counting adaptation device 202 adapts the tHEC or/and eHEC single-bit error correction counting 207 if the signal 205 indicates to enable the compensating process of payload area descrambler error multiplication factor, and the two device 201 and 202 provide the adapted counting signals 209 and 210 to the network management system respectively;

a tHEC or/and eHEC additional single-bit error correction counting adaptation device 203 for, if the signal 205 indicates to enable the compensating process of payload area descrambler error multiplication factor, adapting tHEC or/and eHEC additional single-bit error correction counting 208, and providing the adapted counting signal 211 to the network management system; and an enable or disable signal adaptation device 204, for adapting the signal 205 which indicates to enable or disable the compensating process of payload area descrambler error multiplication factor, and is sent out from the network management system to the GFP processor, and providing the adapted enable or disable signal 83 to the device 80 of correcting tHEC or/and eHEC additional single-bit error.

Figure 12:
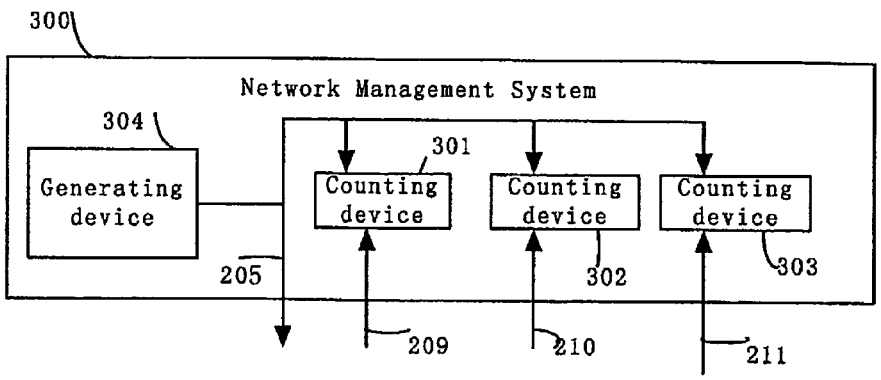
FIG. 12 illustrates a network management system according to an embodiment of the present invention.

FIG. 12 illustrates a network management system according to an embodiment of the present invention.

As illustrated in FIG. 12, the network management system 300 comprises: an enable or disable signal generating device 304, for generating an enable or disable signal 205, which indicates to enable or disable the compensating process of payload area descrambler error multiplication factor; tHEC or/and eHEC single-bit error correction counting devices 301 and 302 for, under the control of the enable or disable signal 205, counting the adapted counting signals 209 and 210 provided by the tHEC or/and eHEC single-bit error correction counting adaptation devices 201 and 202 respectively, wherein the tHEC or/and eHEC single-bit error correction counting device 301 counts the adapted counting signal 209 if the signal 205 indicates to disable the compensating process of payload area descrambler error multiplication factor, however, the tHEC or/and eHEC single-bit error correction counting device 302 counts the adapted counting signal 210 if the signal 205 indicates to enable the compensating process of payload area descrambler error multiplication factor; and a tHEC or/and eHEC additional single-bit error correction counting device 303 for, if the signal 205 indicates to enable the compensating process of payload area descrambler error multiplication factor, counting the adapted counting signal 211.

Various alterations and modifications can be made without departing from the concept and scope of the present invention. It shall be understood that the present invention is not limited to the specific embodiments and the scope thereof is defined by the claims as appended.

What is claimed is:

1. A method of processing a generic framing procedure (GFP) frame using a GFP Protocol Processor, the method includes the steps of:
    (a) correcting a type Header Error Check (tHEC) or/and an extension Header Error Check (eHEC) additional single-bit error with a first error correction device, wherein the additional single-bit error was generated by a descrambler; and
    (b) correcting an tHEC or/and eHEC single-bit error with a second error correction device that is directly coupled to an output of the first error correction device, wherein the step of correcting the additional single bit error incorporates information from the step of correcting the single-bit error;
    wherein the step of correcting the additional single-bit error comprises the steps of:
    generating an additional single-bit error correction mask; and
    performing an exclusive-OR operation on a payload of the GFP frame with the additional single-bit error correction mask to correct the tHEC or/and eHEC additional single-bit error.

2. The method as claimed in claim 1, characterized in that the method further includes the step of:
    processing the GFP frame by correcting a core Header Error Check (cHEC) single-bit error before correcting the tHEC or/and the eHEC additional single-bit error.

3. The method as claimed in claim 2, characterized in that the steps of correcting the tHEC, eHEC, or/and cHEC single-bit error includes the steps of:
    performing cyclic redundancy check on received cHEC, tHEC or/and eHEC and corresponding data and generating a cyclic redundancy check value; and
    locating and correcting a cHEC, tHEC or/and eHEC single-bit error according to the cyclic redundancy check value.

4. The method as claimed in claim 3, characterized in that,
    if the cyclic redundancy check value equals 0, it is deemed that no error bit occurs;
    if the cyclic redundancy check value equals one of a plurality of specified values, it is deemed that an error occurs to a bit corresponding to the value, and the error bit is corrected by inverting it; and
    if the cyclic redundancy check value does not equal 0 or one of the plurality of specified values, it is deemed that a multi-bit error occurs.

5. The method as claimed in claim 1, characterized in that the step of correcting the tHEC or/and eHEC additional single-bit error can be enabled or disabled according to an enable or disable signal.

6. The method as claimed in claim 1, characterized in that, the tHEC or/and eHEC additional single-bit error correction mask is generated according to a tHEC or/and eHEC single-bit error position indication signal, an input data valid indication signal, a payload Frame Check Sequence (pFCS) enabling signal and a pFCS check error indication signal.

7. The method as claimed in claim 6, characterized in that the tHEC or/and eHEC additional single-bit error correction mask is generated further according to an enable or disable signal, which indicates to enable or disable the step of correcting the tHEC or/and eHEC additional single-bit error.

8. The method as claimed in claim 6, characterized in that the mask is initialized firstly and a bit of the tHEC or/and eHEC additional single-bit error correction mask is only set if:
there exists a tHEC or/and eHEC single-bit error, it being the 43rd bit of payload input data after the tHEC or/and eHEC single-bit error,
the pFCS of a previous GFP frame is enabled, and
the pFCS check of the previous GFP frame shows that it has no error.

9. The method as claimed in claim 8, characterized in that a bit of the tHEC or/and eHEC additional single-bit error correction mask is only further set if the enable or disable signal indicates to enable the step of correcting the tHEC or/and additional single-bit error.

10. The method as claimed in claim 1, wherein the GFP frame is processed by:
performing steps (a) and (b) in a first path, wherein the step of correcting an tHEC or/and eHEC additional single bit error is fixedly enabled;
(c) preforming parallel to the first path in a second path a tHEC or/and eHEC single-bit error correction; and
(d) selecting the GFP frame to be further processed from the GFP frame processed by the first path and from the GFP frame processed by the second path.

11. The method as claimed in claim 10, wherein the step of selecting the GFP frame comprises the step of:
selecting the GFP frame to be further processed from the GFP frame processed by the first path and from the GFP frame processed by the second path according to a pFCS check result thereof.

12. A processing chip for processing a GFP frame, characterized in that the chip includes circuits for implementing the functions as claimed in claim 1:
wherein the chip comprises a first circuit for correcting the tHEC or/and the eHEC additional single-bit error in a GFP frame and a second circuit for correcting the tHEC or/and eHEC single-bit error in the GFP frame.

13. The processing chip of claim 12, wherein the first and the second circuits are located in a first processing path of the chip;
wherein the chip comprises a third circuit in a second processing path, parallel to the first processing path, for correcting a tHEC or/and eHEC single-bit error in the GFP frame;
wherein the chip further comprises a frame selector, for selecting the GFP frame to be further processed from the GFP frame processed by the first processing path and from the GFP frame processed by the second processing path.

14. The processing chip of claim 13, wherein the chip further comprises a fourth circuit for correcting a core Header Error Check (cHEC) single-bit error of the GFP frame before being processed by the first and the second processing paths.

15. A device for processing a generic framing procedure (GFP) frame, comprising:
a first error correction device, for correcting a type Header Error Check (tHEC) or/and an extension Header Error Check (eHEC) additional single-bit error of a GFP frame, wherein the additional single-bit error was generated by a descrambler; and
a second error correction device, directly coupled to an output of said first error correction device, for correcting an tHEC or/and eHEC single-bit error of said GFP frame after being processed by said first error correction device;
wherein the first error correction device comprises:
a mask generating device for generating an additional single-bit error correction mask, and
an XOR device for performing an exclusive-OR operation on a payload of the GFP frame with the additional single-bit error correction mask to correct the tHEC or/and eHEC additional single-bit error.

16. The device of claim 15, wherein the first error correction device further comprises:
a cyclic redundancy check device, for performing cyclic redundancy check on received core Header Error Check (cHEC), tHEC or/and eHEC data and generating a cyclic redundancy check value;
a storage device, for storing a corresponding relationship table between cyclic redundancy check values and positions of single-bit errors; and
a locating and correcting device, for locating and correcting the cHEC, tHEC or/and eHEC single-bit error according to the cyclic redundancy check value calculated by the cyclic redundancy check device by using the corresponding relationship table stored in the storage device.

17. The device as claimed in claim 16, characterized in that:
if the cyclic redundancy check value equals 0, it is deemed that there is no error bit;
if the cyclic redundancy check value equals one of a plurality of specified values, it is deemed that an error occurs to a bit corresponding to the value, and the error bit is corrected by inverting it; if the cyclic redundancy check value does not equal 0 or one of the plurality of specified values, it is deemed that a multiple-bit error occurs.

18. The device of claim 17, characterized in that the mask generating device is operable to generate the tHEC or/and eHEC additional single-bit error correction mask according to a tHEC or/and eHEC single-bit error position indication signal, an input data valid indication signal, a payload Frame Check Sequence (pFCS) enabling signal and a pFCS check error indication signal.

19. The device of claim 18, characterized in that the mask generating device is further operable to generate tHEC or/and eHEC additional single-bit error correction mask according to an enable or disable signal, which indicates to enable or disable the correcting of the tHEC or/and eHEC additional single-bit error.

20. The device of claim 15, characterized in that the device comprises:
a first processing path comprising the first error correction device and the second error correction device, wherein a GFP frame is first processed by the first error correction device and then by the second error correction device;
a second processing path comprising a third error correction device for correcting an tHEC or/and eHEC single-bit error, wherein the second processing path is operable to process a GFP frame in parallel with the first error correction device and the second error correction device of the first processing path; and
a frame selector, for selecting the GFP frame to be further processed from the GFP frame processed by the first processing path and from the GFP frame processed by the second processing path.

21. The device of claim 20, wherein each of the first and the second processing paths comprise:
a GFP frame buffer for storing the GFP frame temporarily;
a checking device for checking whether a payload Frame Check Sequence (pFCS) is enabled in the GFP frame on the GFP frame buffer; and
a processing device for performing pFCS check on a payload information field of the GFP frame to indicate whether the GFP frame has an error bit if pFCS is enabled in the GFP frame;
wherein the frame selector is operable to select the GFP frame to be further processed according to a pFCS check result of the GFP frame.

22. The device of claim 15, further comprising:
a core Header Error Check (cHEC) single-bit error correction device, for correcting a cHEC single-bit error, wherein a GFP frame is processed by the first error correction device and the second error correction device after being processed by the cHEC single-bit error correction device; and
a payload Frame Check Sequence (pFCS) processing device, for performing a pFCS check process on payload of the GFP frame after being processed by the payload header processor so as to obtain a pFCS check error indication signal.

23. The device of claim 15, further comprising:
a tHEC or/and eHEC single-bit error correction counting adaptation device, for adapting counting of tHEC or/and eHEC single-bit error correction;
a tHEC or/and eHEC additional single-bit error correction counting adaptation device, for adapting counting of tHEC or/and eHEC additional single-bit error correction; and
an enable or disable signal adaptation device, for adapting the signal which indicates to enable or disable the correcting of the tHEC or/and eHEC additional single-bit error.

24. The device of claim 23, characterized in that the device comprises two tHEC or/and eHEC single-bit error correction counting adaptation devices, one of which is operable to adapt counting of tHEC or/and eHEC single-bit error correction when the signal indicates to disable the correcting of the tHEC or/and additional single-bit error, and the other of which is operable to adapt counting of tHEC or/and eHEC single-bit error correction when the signal indicates to enable the correcting of the tHEC or/and eHEC additional single-bit error.

* * * * *